Nov. 21, 1944.   H. L. STASSE   2,363,158
PROCESS FOR THE PURIFICATION OF PIPERIDINE
Filed May 8, 1943
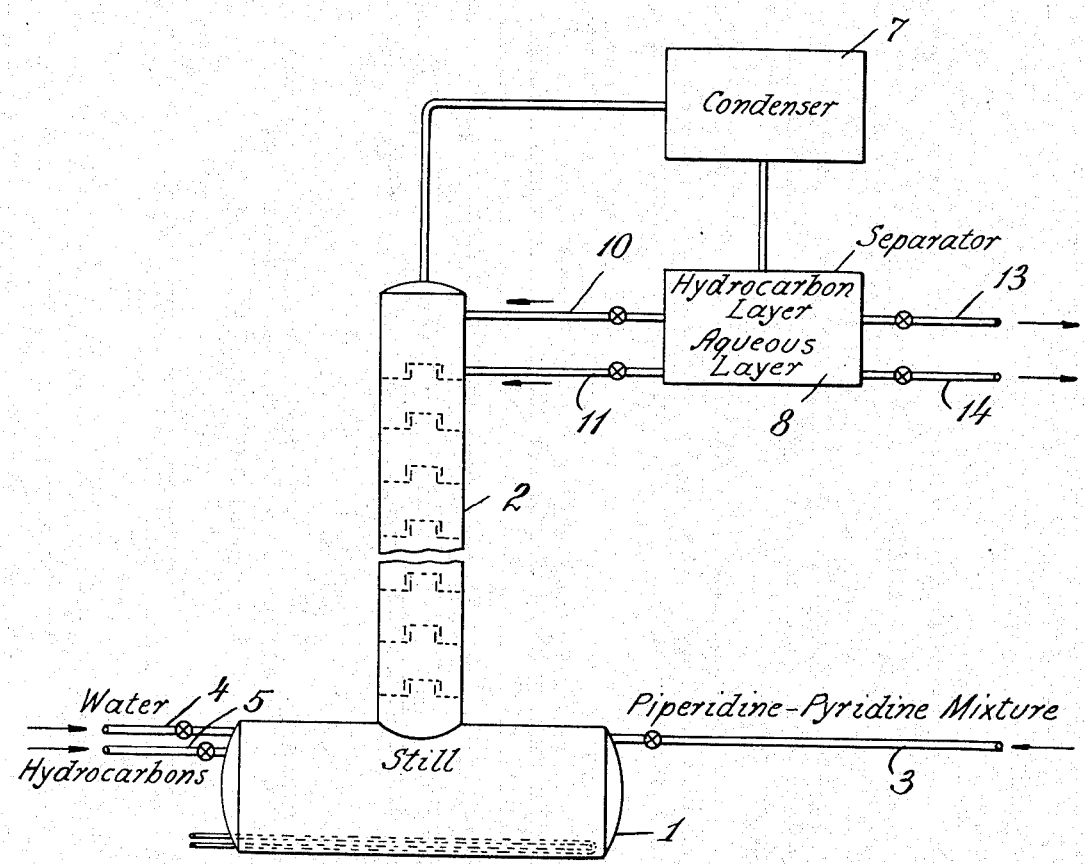
INVENTOR.
Henry L. Stasse
BY
Gordon A. Wilkins
ATTORNEY Patented Nov. 21, 1944

2,363,158

UNITED STATES PATENT OFFICE 2,363,158

PROCESS FOR THE PURIFICATION OF PIPERIDINE

Henry L. Stasse, Hawthorne, N. J., assignor to Allied Chemical & Dye Corporation, New York, N. Y., a corporation of New York Application May 8, 1943, Serial No. 486,254

13 Claims. (Cl. 202—42)

This invention relates to the separation of piperidine from pyridine and more particularly to a distillation process for the purification of piperidine associated with pyridine.

In the production of piperidine by hydrogenation of pyridine, reaction mixtures constituted predominantly of piperidine and containing substantial proportions, e. g., 5 to 20 per cent by weight of pyridine, and small amounts of aliphatic amines such as amylamine are ordinarily obtained. While pure piperidine boils at about 105.8° C. and pyridine boils at about 115.3° C., complete separation of these materials cannot be accomplished by ordinary fractional distillation because they form a constant boiling mixture containing not over about 92 per cent by weight of piperidine and at least 8 per cent of pyridine boiling at about 106.1° C. at atmospheric pressure (760 mm. of mercury). Hence, piperidine substantially free from pyridine cannot be obtained by conventional fractional distillation of piperidine-pyridine mixtures.

It is an object of the invention to provide a distillation process for the recovery of relatively pure piperidine from mixtures containing piperidine and pyridine.

It is a further object of the invention to provide an economical process of separating piperidine from mixtures containing piperidine and pyridine by distilling off the pyridine as an azeotropic mixture containing water.

It is another object of the invention to provide a process for simultaneously removing pyridine from and dehydrating water-piperidine-pyridine mixtures. Other objects and advantages will appear hereinafter.

In accordance with the invention, mixtures containing piperidine and pyridine are fractionally distilled in the presence of water and non-aromatic hydrocarbons capable of forming azeotropic mixtures containing the water, hydrocarbons and a relatively high ratio of pyridine to piperidine, which azeotropic mixtures boil below the boiling point of pyridine, particularly aliphatic and alicyclic hydrocarbons boiling within the range of 80° C. to 110° C., preferably within the range of 90° to 105° C. In carrying out the process, a relatively large amount of water and small amount of the hydrocarbon or a small amount of water and large amount of hydrocarbon, or any desired intermediate proportions of water and hydrocarbon may be utilized. The distillate is separated into layers to separate the hydrocarbon from the water. When a large amount of water and small amount of hydrocarbon are utilized, the hydrocarbon layer is returned to the still until the desired purification of the piperidine is effected; when a large amount of hydrocarbon and a small amount of water is employed, the water layer is returned to the still during the distillation.

Distillation of piperidine-pyridine mixtures in the presence of water and the above mentioned hydrocarbons yields water-hydrocarbon-piperidine-pyridine azeotropic distillates containing a higher ratio of pyridine to piperidine than is present in the still charge, thereby leaving a residue enriched in piperidine. The fact that the azeotropic distillates contain relatively high ratios of pyridine to piperidine permits progressive removal of pyridine as distillate.

Purification of piperidine by azeotropic distillation in accordance with the invention may be effected to greatest advantage utilizing piperidine-pyridine mixtures containing about 80 to 95 per cent of piperidine and 5 to 20 per cent pyridine based on the weight of the mixture. By utilizing such mixtures high yields of piperidine of a purity of 98 per cent by weight or higher are readily obtained. When it is desired to employ mixtures containing more than about 20 per cent of pyridine, they are preferably fractionated by non-azeotropic fractional distillation to obtain fractions of piperidine content of at least 80 per cent by weight prior to azeotropic distillation. Piperidine-pyridine mixtures containing materially less than 80 per cent of piperidine may also be azeotropically distilled in accordance with the invention to obtain piperidine of 95 to 98 per cent or higher purity. When mixtures of low piperidine content, say lower than 30 per cent based on the weight of the mixture, are azeotropically distilled, a large volume of distillate must be taken off before a relatively small proportion of pure piperidine is obtained. An equal quantity of pure product can be obtained with considerable saving of distillation time if such mixtures of low piperidine content are concentrated by non-azeotropic fractional distillation prior to an azeotropic distillation.

As the hydrocarbon material, either substantially pure hydrocarbon compounds or hydrocarbon mixtures may be utilized. Suitable hydrocarbons include aliphatic saturated and unsaturated, straight and branched-chain hydrocarbons, alicyclic unsaturated hydrocarbons and cycloparaffins, for example 3-methylhexane, n-heptane, cyclohexane, 1,1-dimethylcyclopentane, 1,2-dimethylcyclopentane, 1,3-dimethylcyclopentane, cyclohexene, cyclohexadiene, methylcyclohexadiene, di-isobutylene, methylcyclohexane, and petroleum fractions constituted predominantly of paraffinic, olefinic or naphthenic compounds, or mixtures thereof, boiling within the desired boiling range. I prefer to employ aliphatic and naphthenic hydrocarbons as azeotropic agents. At least a substantial portion, preferably all, of the hydrocarbons should boil within the range of 80° to 110° C., preferably from 90° to 105° C. In general, the lower the boiling point of the hydrocarbon, the greater the amount required to effect separation as aqueous distillate of a given amount of pyridine; on the other hand, hydrocarbons of higher boiling point than are distilled off during removal of the aqueous azeotropic distillate containing pyridine are difficult to remove from the piperidine residue. Hence, in preparing hydrocarbon fractions for use in accordance with the invention, it is preferable to exclude from the fractions undue amounts of hydrocarbons boiling too low for economical separation of pyridine as aqueous azeotropic distillate and hydrocarbons boiling too high for removal as distillate during removal of the pyridine.

The accompanying drawing is a flow sheet illustrating diagrammatically an arrangement of conventional apparatus which may be employed in carrying out the invention.

In the drawing, reference numeral 1 designates a still equipped with a fractionating column 2. Valved pipes 3, 4 and 5 are inlets through which piperidine-pyridine mixture, water and hydrocarbon material, respectively, may be introduced into the still. Vapors from the fractionating column discharge into condenser 7, communicating with a conventional separator 8 constructed to permit separation of the distillate from the condenser into a hydrocarbon layer and an aqueous layer and return of any desired proportion of either or both layers to column 2 through valved conduits 10 and 11, the remainder of the layers being withdrawn through valved conduits 13 and 14.

The invention may be carried out by charging a mixture containing piperidine and from 5 to 20 per cent by weight of pyridine into still 1 together with from 5 to 200 per cent of water and 300 to 10 per cent of hydrocarbon material based on the volume of the piperidine-pyridine mixture and azeotropically distilling the still charge. An azeotropic water-hydrocarbon-pyridine-piperidine distillate containing a higher ratio of pyridine to piperidine than the still charge is driven off, the distillate vapors are condensed in condenser 7 and the condensate is discharged into separator 8 which may be set to return any desired proportions of the aqueous and hydrocarbon layers to the column 2 to furnish reflux and maintain equilibruim within the column. The proportions of the aqueous and hydrocarbon layers returned to the column depends on the proportions of water and hydrocarbon in the still charge. If the still charge contains an excess of water, i. e., a greater ratio of water to hydrocarbon than is present in the distillate, all or at least a sufficient portion of the hydrocarbon layer is returned to the column to maintain azeotropic equilibrium with the water, pyridine and piperidine therein. On the other hand, if the still charge contains an excess of hydrocarbon, all or a sufficient portion of the aqueous layer to provide the desired azeotropic equilibrium is returned to the column. A portion of the hydrocarbon layer or water layer or both containing a higher ratio of pyridine to piperidine than is present in the still charge is continuously withdrawn through conduit 13 or 14 or both. The distillation may be continued until all of the hydrocarbon and all or only a little water are removed from the still; when desired a little methyl or ethyl alcohol may be added to the still to remove the last of the hydrocarbon as an alcohol-hydrocarbon azeotropic distillate and a little benzene may be added to the still to remove the last few per cent of water as a benzene-water azeotropic distillate. After all of the water an hyrocarbon are removed from still 1, the purified piperidine remaining as residue may be distilled off and collected.

The azeotropic hydrocarbon and aqueous distillates may be treated in any suitable manner to separate the pyridine and piperidine therefrom. For example, the initial portion of the hydrocarbon distillate containing a higher ratio of pyridine to piperidine than 25 to 75 may be azeotropically distilled in the presence of methyl alcohol or ethyl alcohol to drive off the hydrocarbon and alcohol as azeotropic distillate leaving as residue a pyridine-piperidine mixture which may be fractionally distilled to concentrate the piperidine or rehydrogenated. The hydrocarbon and alcohol may readily be separated into layers and recovered for re-use. The initial portion of aqueous distillate containing a higher ratio of pyridine to piperidine than 25 to 75 may be dehydrated by azeotropic distillation in the presence of benzene leaving pyridine-piperidine residue which may be fractionally distilled to concentrate the piperidine or rehydrogenated. The portions of the hydrocarbon and aqueous azeotropic distillates containing higher ratios of piperidine to pyridine than 75 to 25 may be charged into the still with a subsequent batch of piperidine-pyridine mixture.

In a modified form of the invention, instead of mixing the piperidine-pyridine mixture simultaneously with water and hydrocarbon, the mixture may be first distilled in the presence of water alone to obtain an aqueous azeotropic distillate containing between about 95 and 97 parts by weight of piperidine to each part of pyridine and this aqueous distillate then azeotropically distilled in the presence of a suitable non-aromatic hydrocarbon. A distillate containing the water, hydrocarbon and a high ratio of pyridine to piperidine is driven off leaving a residue constituted of piperidine of 98 per cent or higher purity.

The following examples are further illustrative of the invention:

Example 1

A reaction mixture obtained by hydrogenating pyridine was distilled to remove water and high boiling compounds such as dipiperidyls; the resultant product contained about 89 per cent by weight of piperidine, 9.5 per cent of pyridine and 1 per cent of aliphatic amines calculated as amylamine. 100 parts by volume of this mixture were charged with 65 parts by volume of a petroleum distillate fraction boiling within the range of from 90.8° to 93.8° C. constituted of straight and branched chain hydrocarbons and 220 parts by volume of water into a still having a fractionating column equipped with a head arranged to separate the condensate into two layers and return any desired proportion of either or both layers to the column. The still charge was azeotropically distilled while returning all of the hydrocarbon layer of the condensed distillate and about 50 per cent of the aqueous layer to the column, the remainder of the aqueous distillate being withdrawn from the apparatus. When all except 3 to 5 parts by volume of the water were removed from the still, the hydrocarbon layer was also withdrawn from the apparatus and removal of residual water from the still was completed by adding 5 parts by volume of benzene to the still and continuing the distillation whereby the water was driven off as a benzene-water azeotropic mixture. Data on the azeotropic distillation of petroleum hydrocarbon-water-piperidine-pyridine mixture are given in the following table, the ratios being by weight:

| Fraction | Vapor temperature, °C. | Total distillate withdrawn (parts by volume) | | Ratio of water and hydrocarbon to bases in fraction | Ratio of piperidine to pyridine in fraction |
|---|---|---|---|---|---|
| | | Water and hydrocarbon | Bases | | |
| 1 | 76.6 | 38.0 | 2.0 | 95:5 | 10:90 |
| 2 | 76.6 | 76.0 | 4.0 | 95:5 | 13:87 |
| 3 | 76.6 | 95.1 | 4.9 | 95:5 | 16:84 |
| 4 | 76.6 | 114.2 | 5.8 | 95:5 | 18:82 |
| 5 | 76.8 | 133.4 | 6.6 | 96:4 | 18:82 |
| 6 | 76.8 | 152.6 | 7.4 | 97:3 | 21:79 |
| 7 | 76.8 | 172.0 | 8.0 | 97:3 | 28:72 |
| 8 | 76.8 | 191.5 | 8.5 | 97:3 | 32:68 |
| 9 | 76.8 | 215.8 | 9.2 | 98:2 | 40:60 |
| 10 | 77.0 | 254.3 | 10.7 | 95:5 | 60:40 |
| 11 | 92.0 | 280.0 | 12.0 | 92:8 | 90:10 |

In fractions 1 to 9, inclusive, the distillate withdrawn from the still was constituted of water, pyridine and piperidine, and in fractions 10 and 11 the withdrawn distillate was constituted of petroleum hydrocarbons, pyridine and piperidine. The still residue amounted to 78 parts by volume of piperidine of 98.5 per cent purity containing .8 per cent by weight of pyridine and .5 per cent of aliphatic amines calculated as amylamine, representing recovery of 86 per cent of the piperidine content of the original still charge. An additional 10 per cent of the piperidine could be recovered azeotropically distilling fractions numbers 10 and 11 with a subsequent batch of piperidine-pyridine mixture. The pyridine and piperidine present in fractions 1 to 9 may be recovered in any desired manner, for example, by distilling these fractions in the presence of benzene to drive off the water as a benzene-water azeotropic distillate with benzene and then fractionating or rehydrogenating the piperidine-pyridine residue.

*Example 2*

100 parts by volume of crude piperidine and 100 parts by volume of petroleum distillate both similar to the materials employed in Example 1, and 3 parts by volume of water were distilled in the apparatus employed in Example 1. The hydrocarbon-pyridine-piperidine layer was removed from the apparatus and the aqueous layer was returned to the column. The ratio of pyridine to piperidine in the hydrocarbon layer was particularly high (about 96:4) during the early stages of the distillation. After removal of the hydrocarbon and water, a still residue containing piperidine of 98 per cent or higher purity remains. The pyridine and piperidine present in the hydrocarbon distillate may be recovered by azeotropic distillation of the distillate in the presence of methyl or ethyl alcohol. If desired, the portion of the distillate richer in piperidine may be azeotropically distilled with a subsequent batch of piperidine-pyridine mixture.

*Example 3*

A pyridine hydrogenation product was fractionally distilled to free it from low boiling constituents and high boiling constituents such as dipiperidyls. 100 parts by volume of the distilled product containing about 90.8 per cent by weight of piperidine, 7.9 per cent of pyridine and 1 per cent of aliphatic amines calculated as amylamine were charged with 240 parts by volume of methylcyclohexane and 5 parts by volume of water into a still similar to that utilized in Example 1 and the mixture was azeotropically distilled. The methylcyclohexane - water - pyridine - piperidine azeotropic distillate condensed in the still head in two layers. All of the lower aqueous layer was returned continuously to the top of the fractionating column while a portion of the upper methylcyclohexane layer was withdrawn, the remainder of this layer being returned to the column. When nearly all of the methylcyclohexane had been removed from the still, the aqueous layer was withdrawn until the still was free from water. Distillation was then continued until the residual methylcyclohexane had been removed from the still. Data on the distillation are given in the following table:

| Fraction | Vapor temperature, °C. | Parts by volume in total distillate | | Weight ratio of hydrocarbon and water to bases in fraction | Weight ratio of piperidine to pyridine in fraction |
|---|---|---|---|---|---|
| | | Methylcyclohexane and water | Bases | | |
| 1 | 79.6 | 19 | 1 | 95:5 | 31:69 |
| 2 | 79.7 | 38 | 2 | 95:5 | 16:84 |
| 3 | 79.7 | 57.2 | 2.8 | 96:4 | 14:86 |
| 4 | 79.7 | 76.4 | 3.6 | 96:4 | 17:83 |
| 5 | 80.0 | 95.5 | 4.5 | 95.5:4.5 | 27:73 |
| 6 | 80.0 | 114.5 | 5.5 | 95:5 | 31:69 |
| 7 | 79.7 | 133.3 | 6.7 | 94:6 | 51:49 |
| 8 | 79.8 | 152.0 | 8.0 | 93.5:6.5 | 62:38 |
| 9 | 80.0 | 170.6 | 9.4 | 93:7 | 74:26 |
| 10 | 80.0 | 189.2 | 10.8 | 93:7 | 84:16 |
| 11 | 80.1 | 207.8 | 12.2 | 93:7 | 90:10 |
| 12 | 80.1 | 226.5 | 13.5 | 93.5:6.5 | 94:6 |
| 13 | 80.1 | 235.8 | 14.2 | 93:7 | 95:5 |
| 14 | 90.0 | 242.3 | 14.7 | 93:7 | 95:5 |
| 15 | 92.2 | 245.7 | 20.3 | 30:70 | |
| 16 | 97.2 | 246.7 | 24.3 | 20:80 | |
| 17 | 106.6 | 247.15 | 28.85 | 9:91 | |
| 18 | 106.75 | 247.25 | 33.75 | 1.8:98.2 | |

Fractions 1 to 14, inclusive, were constituted of methylcyclohexane and bases, fractions 15 and 16 contained substantially all of the water in the still charge and fractions 17 and 18 contained the residual methylcyclohexane.

The still residue was constituted of 63 parts by volume of piperidine of 98.1 per cent purity containing .3 per cent pyridine and .6 per cent of aliphatic amines calculated as amylamine, representing about 70 per cent of the piperidine content of the original still charge. An additional 20 per cent of the original piperidine is recoverable by azeotropically distilling fractions 10 to 18 with a subsequent batch of piperidine-pyridine mixture. The piperidine and pyridine can be recovered from fractions 1 to 9 by azeotropic distillation in the presence of methyl or ethyl alcohol whereby the hydrocarbon and alcohol are driven off as distillate and may be separated into layers for re-use; the piperidine and pyridine remain as still residue.

*Example 4*

200 parts by volume of piperidine-pyridine mixture similar to that employed in Example 1 were charged with 135 parts by volume of water into a still and the mixture was fractionally distilled until 235 parts by volume of distillate containing 157.5 parts by volume of piperidine including aliphatic amines, 4.5 parts by volume of pyridine, and 73 parts by volume of water were obtained. This distillate was charged into a still similar to that employed in Example 1 together with 80 parts by volume of methylcyclohexane and the mixture was azeotropically distilled. The distillate was separated into an aqueous layer and a methylcyclohexane layer. The aqueous layer was removed from the fractionating column and the methylcyclohexane layer was returned to the column until the water was exhausted from the still. The methylcyclohexane was then removed by adding 8 to 10 parts by volume of ethyl alcohol to the top of the column and distilling until the methylcyclohexane and alcohol were driven off as an azeotropic mixture. The still residue was constituted of 150 parts by volume of piperidine of 98.1 per cent purity containing 1.1 per cent of pyridine and .5 per cent of aliphatic amines calculated as amylamine.

Thus it will be seen the invention provides a novel process of purifying piperidine present in mixtures containing piperidine and pyridine by azeotropic distillation of the mixtures in the presence of water and non-aromatic hydrocarbons so that azeotropic mixtures containing pyridine are driven off as distillate leaving a residue enriched in piperidine. The process is highly flexible, permitting the use as azeotropic agents of widely varying proportions of hydrocarbons and water, thus permitting the invention to be adapted to varying conditions such as the availability of suitable hydrocarbons. While the invention is carried out batchwise in the above examples, it may also be carried out in a continuous manner.

Since certain changes may be made without departing from the scope of the invention, it is intended that the above shall be interpreted as illustrative and not in a limiting sense.

What is claimed is:

1. A process of separating piperidine from pyridine which comprises distilling a mixture containing piperidine and pyridine and rectifying the vapors evolved therefrom in the presence of water and non-aromatic hydrocarbon material boiling within the range of 80° to 110° C. capable of forming an azeotropic mixture containing the water, hydrocarbon and a higher ratio of pyridine to piperidine than is present in the mixture being distilled, said azeotropic mixture boiling below the boiling point of piperidine.

2. A process of separating piperidine from pyridine which comprises distilling a mixture containing piperidine, pyridine, water and non-aromatic hydrocarbon material boiling within the range of 80° to 110° C.

3. A process of separating piperidine from pyridine which comprises distilling a mixture containing piperidine, pyridine, water and non-aromatic hydrocarbon material boiling within the range of 90° to 105° C.

4. A process of separating piperidine from pyridine which comprises fractionally distilling a mixture containing piperidine, pyridine, water and hydrocarbon boiling within the range of 80° to 110° C. whereby an azeotropic mixture containing said hydrocarbon, water and a higher ratio of pyridine to piperidine than is present in said first named mixture is distilled off, condensing said azeotropic mixture, separating the condensate into a hydrocarbon layer and an aqueous layer and returning a sufficient amount of at least one of said layers to the fractionating zone to maintain equilibrium therein.

5. A process as specified in claim 4 in which the mixture being distilled contains a lower ratio of hydrocarbon to water than is present in the vapors of the azeotropic mixture distilled off and in which at least a portion of the hydrocarbon layer is returned to the fractionating zone.

6. A process as specified in claim 4 in which the mixture being distilled contains a lower ratio of water to hydrocarbon than is present in the vapors of the azeotropic mixture distilled off and in which at least a portion of the water layer is returned to the fractionating zone.

7. A process of separating piperidine from a mixture containing by weight from 80 to 95 per cent of piperidine and from 20 to 5 per cent of pyridine which comprises fractionally distilling said mixture in the presence of water and non-aromatic hydrocarbon material boiling within the range of 80° to 110° C. capable of forming an azeotropic mixture containing the hydrocarbon, water and a greater ratio of pyridine to piperidine than is present in said first named mixture, said azeotropic mixture boiling below the boiling point of piperidine, thereby leaving a residue enriched in piperidine, collecting at least a portion of said mixture as distillate, distilling at least a portion of said distillate containing a higher ratio by weight of piperidine to pyridine than 75:25 with additional piperidine-pyridine mixture and recovering piperidine and pyridine from the remainder of said distillate.

8. A process of purifying an aqueous distillate containing piperidine and pyridine produced by azeotropically distilling a piperidine-pyridine mixture in the presence of water, which comprises distilling said aqueous distillate in the presence of non-aromatic hydrocarbon material boiling within the range of 80° to 110° C., whereby an azeotropic mixture containing water, said hydrocarbon and a greater ratio of pyridine to piperidine than is present in said aqueous distillate is distilled off leaving a residue containing at least about 98 per cent by weight of piperidine and substantially free from water.

9. A process as specified in claim 3 in which the hydrocarbon material contains at least a substantial proportion of paraffinic material.

10. A process as specified in claim 3 in which the hydrocarbon material contains at least a substantial proportion of cycloparaffinic material.

11. A process as specified in claim 3 in which the hydrocarbon material is a petroleum distillate fraction.

12. A process of separating piperidine from mixtures containing by weight less than 80 per cent of piperidine and more than 20 per cent of pyridine, which comprises non-azeotropically fractionally distilling the mixture to obtain a mixture containing not more than 20 per cent by weight of pyridine, azeotropically fractionally distilling said last named mixture in the presence of water and non-aromatic hydrocarbon material boiling within the range of 80° to 110° C., capable of forming an azeotropic distillate containing the hydrocarbon, water and a greater ratio of pyridine to piperidine than is present in said last named mixture, said azeotropic distillate boiling below the boiling point of piperidine thereby leaving a residue enriched in piperidine.

13. A process of separating piperidine from a mixture containing by weight from 30 to 95 per cent of piperidine and 70 to 5 per cent of pyridine, which comprises fractionally distilling said mixture in the presence of water and non-aromatic hydrocarbon material boiling within the range of 80° to 110° C. capable of forming an azeotropic mixture containing the hydrocarbon, water and a greater ratio of pyridine to piperidine than is present in said first mentioned mixture, said azeotropic mixture boiling below the boiling point of piperidine thereby leaving a residue enriched in piperidine.

HENRY L. STASSE.